United States Patent
Hilger et al.

(10) Patent No.: US 9,784,477 B2
(45) Date of Patent: Oct. 10, 2017

(54) APPARATUS FOR REFLECTING LIGHT

(71) Applicant: Fachhochschule Aachen, Aachen (DE)

(72) Inventors: Patrick Hilger, Wipperfuerth (DE); Cristiano Jose Teixeira Boura, Cologne (DE)

(73) Assignee: FACHHOCHSCHULE AACHEN, Aachen (DE)

( * ) Notice: Subject to any disclaimer, the term of this patent is extended or adjusted under 35 U.S.C. 154(b) by 0 days.

(21) Appl. No.: 15/026,328

(22) PCT Filed: Oct. 14, 2014

(86) PCT No.: PCT/EP2014/002768
§ 371 (c)(1),
(2) Date: Apr. 11, 2016

(87) PCT Pub. No.: WO2015/055302
PCT Pub. Date: Apr. 23, 2015

(65) Prior Publication Data
US 2016/0238283 A1    Aug. 18, 2016

(30) Foreign Application Priority Data

Oct. 15, 2013  (DE) .................. 10 2013 017 037

(51) Int. Cl.
  *G02B 5/10* (2006.01)
  *G02B 5/08* (2006.01)
  (Continued)

(52) U.S. Cl.
  CPC . *F24J 2/38* (2013.01); *F24J 2/54* (2013.01); *G02B 7/183* (2013.01);
  (Continued)

(58) Field of Classification Search
  CPC .......... G02B 7/182; G02B 7/183; G02B 5/08; G02B 17/002; G02B 7/1828;
  (Continued)

(56) References Cited

U.S. PATENT DOCUMENTS

| 4,110,009 A | 8/1978 | Bunch |
| 4,218,114 A | 8/1980 | Bunch |

(Continued)

FOREIGN PATENT DOCUMENTS

| WO | 2006/005303 A1 | 1/2006 |
| WO | 2006005303 A | 1/2006 |
| WO | 2010101468 A | 9/2010 |

*Primary Examiner* — Jade R Chwasz
(74) *Attorney, Agent, or Firm* — Andrew Wilford

(57) ABSTRACT

The invention relates to an apparatus for reflecting incident light, in particular sunlight, comprising a plurality of reflector units arranged next to one another, in particular next to one another in two directions, each reflector unit comprising at least one reflector surface (4), wherein the reflector surfaces (4) of all of the reflector units are pivotable, wherein each reflector unit (2, 3, 4, 5) comprises a rod (3) and comprises a reflector surface (4) fastened at the upper free end of the rod (3) and a lower spherical hinge (5) at the lower end of the rod (3), with which hinge the rod (3) is connected in articulated fashion to a movable coupling element (6), which is common to all of the reflector units (2, 3, 4, 5), and comprises a spherical hinge (2) in an intermediate region between the upper end and the lower end of the rod (3), said hinge connecting, in articulated fashion, the rod (3) to a stationary base element (1) which is common to all of the reflector units (2, 3, 4, 5) and bearing each reflector unit (2, 3, 4, 5) movably about a dedicated stationary hinge center point thereof and wherein, owing to the movement of the coupling element (6) arranged beneath the base element (Continued)

(1), the reflector surfaces (4) of all of the reflector units (2, 3, 4, 5) are movable simultaneously in the same direction and to the same extent.

7 Claims, 1 Drawing Sheet

(51) Int. Cl.
*G02B 7/182* (2006.01)
*F24J 2/38* (2014.01)
*F24J 2/54* (2006.01)
*G02B 7/183* (2006.01)

(52) U.S. Cl.
CPC ............... *F24J 2002/5468* (2013.01); *F24J 2002/5489* (2013.01); *Y02E 10/47* (2013.01)

(58) Field of Classification Search
CPC ........ G02B 17/004; G02B 5/09; G02B 5/122; G02B 5/124; G02B 5/136; G02B 17/0673; G02B 5/10; G02B 7/1821; G02B 7/198; G02B 26/0833; G02B 7/1822; G02B 7/1824; G02B 7/1825; G02B 7/01; Y02E 10/47; Y02E 10/45; F24J 2/38; F24J 2002/1085; F24J 2002/5468; F24J 2002/5437; F24J 2/523; F24J 2/5241; F24J 2/54; F24J 2/10; B60R 1/072
USPC ....... 359/853, 849, 850, 851, 855, 865, 871, 359/872
See application file for complete search history.

(56) References Cited

U.S. PATENT DOCUMENTS

2008/0282828 A1\* 11/2008 Jones ..................... H02S 20/30
74/471 R
2011/0146663 A1\* 6/2011 Ezawa ..................... F03G 6/06
126/600

\* cited by examiner

APPARATUS FOR REFLECTING LIGHT

CROSS REFERENCE TO RELATED APPLICATIONS

This application is the US-national stage of PCT application PCT/EP2014/002768 filed 14 Oct. 2014 and claiming the priority of German patent application 102013017037.0 itself filed 15 Oct. 2013.

FIELD OF THE INVENTION

The invention relates to an apparatus for reflecting incident light, especially sunlight, comprising a plurality of reflector assemblies arranged next to one another, in particular next to one another in two directions, each reflector assembly comprising at least one reflector surface, the reflector surfaces of all of the reflector assemblies being pivotable.

BACKGROUND OF THE INVENTION

Such apparatuses are normally employed to reflect sunlight and to supply it, especially concentrated or bundled, to a target, for example for heating an absorber surface in a solar power station or even just for illumination purposes in which case it is unbundled. To this end the individual reflector surfaces are each moved individually, in groups, or all together.

The movement of the reflector surfaces normally compensates for the movement of the earth around the sun over the course of a day, that is, a reflected light bundle at least essentially holds the same orientation, for example onto an absorber surface. Such arrangements are also called heliostats. The invention is not limited to such movement-compensating applications, however.

An apparatus for reflecting sunlight having a plurality of reflector assemblies is known for example from WO 2006/005303.

In prior applications it has proved problematic to move the plurality of reflector surfaces of the reflector assemblies synchronously and with great precision. In particular, the simultaneous movement of the reflector surfaces is complex in terms of mechanics and drive technology. In addition, previous apparatuses are highly susceptible to wind damage.

OBJECT OF THE INVENTION

It is therefore the object of the invention to improve an apparatus of the above-described type such that within one apparatus the individual reflector surfaces of the reflector assemblies may be moved simultaneously and precisely using mechanically simple and cost-effective drive technology.

SUMMARY OF THE INVENTION

The object is inventively attained in that each reflector assembly comprises a rod having an upper free end carrying a reflector surface and a lower end connected with a lower spherical joint, especially a universal joint that pivotally connects the rod to a movable coupling element that is common to all of the reflector assemblies, in particular with the joint center points of all spherical joints in a common plane at the lower ends of the rods, and a spherical joint, in particular a universal joint, in an intermediate region between the upper end and the lower end of the rod and pivotally connecting the rods to a stationary base that is common to all of the reflector assemblies and that allows movement of each reflector assembly about a dedicated stationary joint center point thereof, in particular where the stationary joint center points of all the middle spherical joints lie in a common plane, and where, owing to the movement of the coupling element beneath the base, the reflector surfaces of all of the reflector assemblies are movable simultaneously in the same direction and to the same extent.

It is an essential core idea of the invention to couple the individual reflector assemblies to one another mechanically such that they may also all be correspondingly moved simultaneously by the movement of a single common coupling element.

In this case, this mechanical coupling is effected using a common coupling element to which all the lower spherical joints, especially universal joints, are connected to the lower ends of the rods of the reflector assemblies. With respect to an inventive apparatus, all of the lower spherical joints of the reflector assemblies in the apparatus are attached to the one common coupling element.

The inventively preferred embodiment provides that the joint center points of these spherical joints all lie in a common plane, for which reason the middle spherical joints are connected for example on or in a flat plate or other flat element as coupling element. For instance, a coupling element may also be embodied as a grid, wherein the spherical joints are arranged at the grid nodes. Such a coupling element may have very large open areas, specifically the grid mesh, and is thus very simple to construct.

The joint center point in this case is that point in a spherical joint about which the movement of the joint occurs.

In addition to the movable coupling element, an inventive apparatus has a base that is stationary in space, for example a base that is stationary in the terrestrial reference system, which base also like the coupling element may be embodied as a flat plate or other flat element, for example as a grid, having the same joint arrangement as was described for the coupling element.

On this base, all reflector assemblies of an inventive apparatus are movable about a rotation point in a region of the rod between its two ends, and this rotation point of the joint center point is part of a spherical joint, such as for example a universal joint.

Each rod of each reflector assembly is thus movable using active movement of its lower end about a rotational point between lower and upper end so that, owing to the movement of the coupling element connecting all the lower ends, all the reflector surfaces attached at the upper end are moveable.

The ratio of the movement distances from the coupling element and of the reflector surfaces is adjustable using the ratio of the lengths of the rod segments between lower spherical joint and the spherical joint in the intermediate region and between the reflector surface and the spherical joint in the intermediate region. The length ratios may preferably be selected to be 1:1.

The inventive apparatus proves to be particularly precise because high internal precision may be provided simply due to the spherical joints, in particular when using universal joints with typically less than 90 degrees crossed pivot axes of the gimbals.

In principle, a drive of the movable coupling element in at least two directions, especially at least two mutually perpendicular directions, for the purpose of moving all of the reflector surfaces simultaneously may be of any type.

In contrast, one particularly preferred inventive type provides for introducing the movement into the coupling element via the stationary base, especially via universal joints connected thereto.

To this end, a preferred embodiment of the invention may provide that the apparatus comprises first and second drives that each comprise a universal joint that is connected to the base and that is connected via a connecting rod movable about the joint center point of the universal joint to a middle spherical joint, especially a universal joint, connected to the coupling element, in which the rod is movable about the joint center point and the middle universal joints connected to the base are driven, especially by motor, by the first and second drive about mutually perpendicular pivot axes.

The kinematic connection in a drive is consequently mechanical exactly as within a reflector assembly, which also permits the possibility of integrating each drive directly within a reflector assembly, even though the invention may also provide for providing any drive separately from the reflector assemblies.

Within a drive, the drive occurs on a pivot axis of the universal joint that is connected to the base. This introduces the drive energy directly into the joint center point. Both the inner pivot axis and also the outer pivot axis of the universal joint may be driven. For instance, with drive of the internal pivot axis, a drive may be arranged in the center gimbal of the universal joint, which is also not a problem in terms of the connection, since only reversing axis rotations less than 180 degree occur in the apparatus. Likewise, the outer pivot axis may be driven, which is preferred in an embodiment that has yet to be described.

Since the driven pivot axes of both drives or their universal joints are oriented perpendicular to one another, what is achieved is that a movement in two degrees of freedom is possible and this movement is transmitted to the common coupling element of both drives via the connecting rods of both drives.

Another structurally preferred embodiment may provide that the two independent pivot axes of the two universal joints of the drives, which universal joints are connected to the base, are oriented perpendicular to one another, and each of the two universal joints that connects the outer gimbal of the respective middle universal joint and is attached to the base, to the center gimbal, that is, is driven about that pivot axis, is driven about the outer pivot axis.

This has the advantage that these pivot axes of the universal joints can be accessed from outside with no problem and thus motor drives arranged outside of the universal joints may be provided in order to move these universal joints. For instance, a stepping or servomotor may be connected to these rotary axes. In this embodiment, therefore, the drive axles of the drives, or of the step or servomotors, are oriented perpendicular to one another.

If drives are provided separately to the reflector assemblies, it is considered advantageous when in each drive the connecting rod is connected to a mass element and the total mass, comprising mass element and connecting rod, has a center of gravity that lies in a common plane with the centers of gravity of all the reflector assemblies. What this achieves is that by using the drives all moved masses are moved within the same center of gravity plane, which promotes precise and uniform movement.

If the drives are each realized directly within one of the reflector assemblies, then the driven universal joint forms the spherical joint of a reflector assembly in the intermediate region of the reflector assembly, the connecting rod of the drive is realized using the rod of the reflector assembly, and the lower spherical joint of the drive is formed by the lower spherical joint of a reflector assembly, which joint may likewise be a universal joint.

Consequently, from a mechanical perspective, for embodying a drive in this embodiment of a reflector assembly in the joint center point of its spherical joint embodied as a universal joint is driven in the intermediate region of the rod.

Consequently, in the apparatus there is a first reflector assembly having a driven universal Cardan axis and a second reflector assembly having a driven Cardan axis oriented perpendicular thereto. In addition, as described in the foregoing, the two driven universal joints may be attached to the base oriented perpendicular to one another in the axial direction.

Regardless of the embodiment of the drive, that is, whether realized separately or within a reflector assembly, it may furthermore preferably be provided that the joint center points of those spherical joints, especially those universal joints, that connect a rod (of a reflector assembly) and/or a connecting rod (of a drive) to the common base are arranged above the centers of gravity of the reflector assemblies and/or drives.

Consequently, the centers of gravity of all reflector assemblies and/or drives lie beneath the bearing points that are defined by the joint center points of the spherical or universal joints on the base.

What this advantageously attains is that any clearance that is present within the spherical/universal joints of the base in the direction of gravity is eliminated, thus all reflector assemblies may be moved from this position free of play.

Another embodiment may also provide placing the center of gravity of any reflector assembly or even drive precisely in the joint center point of the specific spherical or universal joint on the base. This produces an indifferent equilibrium so that the reflector assemblies are especially easy to move.

One embodiment that essentially combines both advantages may provide placing the centers of gravity just beneath the joint center points.

Additional embodiments of the invention may provide, for example that at least one reflector assembly includes a tilt sensor. Since all reflector assemblies are coupled, the inclination of all reflector surfaces may thus be determined and where necessary adjusted.

A sun angle sensor may also be provided on the apparatus in order to control the drives as a function of its signal and to adjust the reflector assemblies as a function of the sun angle.

Moreover, any reflector surface is adjustable relative to the rod to which the reflector surface is attached, in particular in at least two degrees of freedom. Thus the reflector surfaces may each be oriented differently relative to the rod and thus for instance with all reflector surfaces a bundling of the sunlight may be attained on a smaller surface than the total surface of all the reflector surfaces.

Within an inventive apparatus, the reflector surfaces and/or reflector assemblies may be arranged in a m×n matrix, where m and n may in principle be any whole number, and especially m may also equal n. One preferred variant may provide that m and n are each an odd number, especially m=n. It may furthermore be provided that a reflector assembly arranged in the center of each of two matrix edges includes the respective drive.

The invention may also be operated as a heliostat by appropriately controlling the drives as a function of the sun angle.

A refinement may also provide arranging a plurality of inventive apparatus adjacent one another, especially adjacent one another in two preferably perpendicular directions, thus creating a field of a plurality of apparatus. In this way it is possible to realize a large heliostat using a plurality of smaller heliostats. The drives of the plurality of apparatus may for example be coupled, thus in particular the drives of a drive direction may all be controlled the same.

BRIEF DESCRIPTION OF THE DRAWING

One embodiment of the invention shall be described in greater detail using the following figures in which.

SPECIFIC DESCRIPTION OF THE INVENTION

Figure 1:
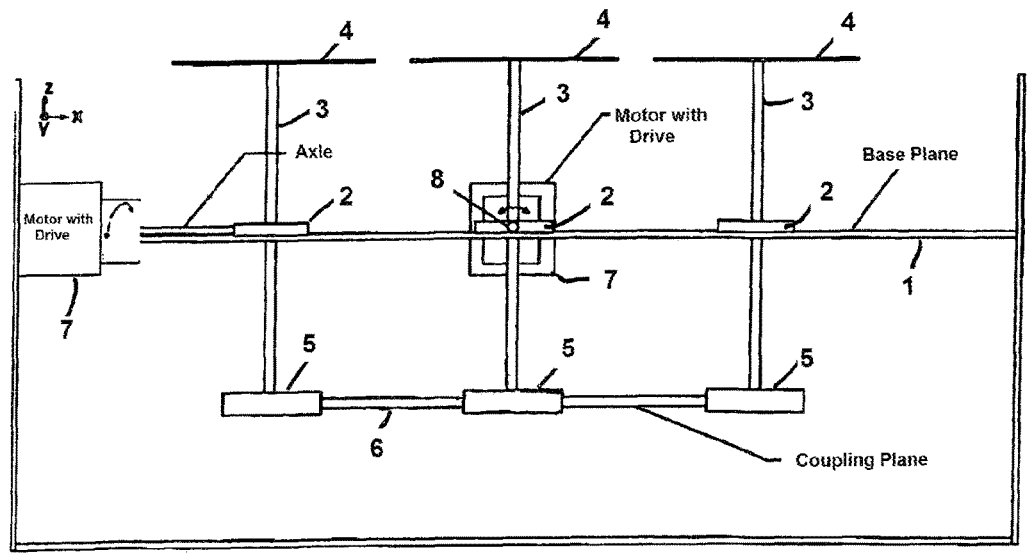
FIG. 1 is a side elevation of an inventive apparatus with, as an example, nine reflector assemblies in a 3×3 matrix arrangement although in principle, this may be any number of reflector assemblies and the number is thus not limiting for the further description.

The apparatus here comprises a base 1 that is stationary in space, i.e. in the terrestrial reference system, and that may be a flat, especially horizontal, plate, for example made of metal (especially aluminum). Connected to this base 1 are a plurality of universal joints 2, in this case nine such joints whose center points all lie in the same plane.

A rod 3 is movably supported in each joint center point of each joint 2 between the upper end and the lower end of the rod 3. The upper end carries a reflector surface 4 and is freely movable. Each reflector surface 4 is at least essentially perpendicular to the respective rod longitudinal axis.

The lower end of each rod 3 is connected via a ball joint 5, again preferably a universal joint, to a common coupling element 6. The reflector assemblies—each formed by a respective reflector surface 4, rod 3, universal joint 2, and spherical joint 5—are thus all connected to one another via the lower rod ends and the coupling element 6 and move simultaneously when the coupling element 6 moves.

Figure 2:
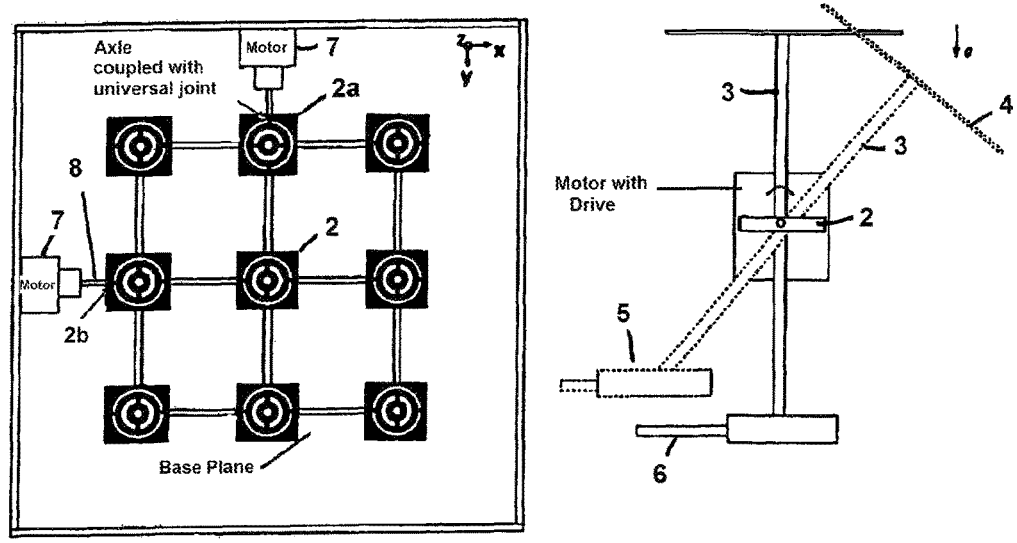
FIG. 2 is on the left a top view of the apparatus and on the right a detail view showing movement of one of the reflector assemblies.

The left side of FIG. 2 is a top view of the base 1. The nine universal joints 2 that movably connect the rod 3 to the base 1 are in the plane of the base 1.

A universal joint 2a, 2b is provided in the center of two matrix edges in the matrix arrangement in order to move the coupling element 6 in two perpendicular directions.

To this end, the outer pivot axes of the universal joints 2a, 2b are each driven with a motor 7, that is, the pivot axes that connect the outer gimbal of the universal joint to the center gimbal, the two universal joints 2a and 2b being attached to the base 1 perpendicular to one another with respect to their axes.

By rotating the pivot axis 8 or the center gimbal of the universal joint 2a, 2b in question, this movement is transmitted via the rod 3 and the lower spherical joint 5 to the coupling element 6 and via the latter to all of the other rods 3.

The orientation of the other universal joints is essentially unimportant, however in one apparatus they may especially all be oriented the same, except for one, which is part of one of two drives, so that two perpendicularly oriented driven universal joints result from this.

The invention claimed is:

1. An apparatus for reflecting incident light, the apparatus comprising:
a plurality of reflector assemblies arranged next to one another rows extending in two mutually perpendicular directions, each assembly having
at least one reflector surface, the reflector surfaces of all of the reflector assemblies being pivotable,
a respective rod having an upper free end carrying a respective one of the reflector surfaces and a lower end, and
a respective lower spherical joint at the lower end of each of the rods;
a movable coupling element pivotally connected to all of the lower ends and common to all of the reflector assemblies with center points of all the lower spherical joints in a common plane at the lower ends of the rods;
a stationary base common to all of the reflector assemblies, below the upper ends, and above the lower ends;
a respective middle spherical joint between the upper end and the lower end of each rod, each middle joint pivotally supporting the respective rod to the stationary base and carrying the reflector assembly movably about a respective dedicated stationary joint center point thereof with the joint center points of all the middle spherical joints in a common plane such that, on movement of the coupling element beneath the base, the reflector surfaces of all of the reflector assemblies move simultaneously in the same direction and to the same extent;
a first motor connected to one of the middle joints of one of the rows extending in one of the directions and through the coupling element to all the lower joints for tipping all of the reflector surfaces about an axis parallel to the one direction; and
a second motor connected to another of the middle joints of another of the rows extending in the other of the directions and and through the coupling element to all the lower joints for tipping all of the reflector surfaces about an axis parallel to the other direction.

2. The apparatus according to claim 1, wherein one of the connecting rods is connected to a mass element and the total mass including the mass element and connecting rod, has a center of gravity that lies in a common plane with centers of gravity of all the reflector assemblies.

3. The apparatus according to claim 1, wherein the joint center points of the middle spherical joints are above the centers of gravity of the reflector assemblies.

4. The apparatus according to claim 1, wherein at least one reflector assembly has a tilt sensor.

5. The apparatus according to claim 1, wherein each reflector surface is adjustable relative to the rod to which the reflector surface is attached in at least two degrees of freedom.

6. The apparatus according to claim 1, wherein the reflector surfaces and/or reflector assemblies are arranged in a m×n matrix, where m and n are each an odd number and m=n.

7. The apparatus according to claim 1, wherein the drives are controlled to form a heliostat.

\* \* \* \* \*